United States Patent
Godding

[15] 3,662,812
[45] May 16, 1972

[54] APPARATUS FOR MIXING SAND/RESIN/CATALYST AND BLOWER-FORMING FOUNDRY CORES

[72] Inventor: Ronald G. Godding, Birmingham, England
[73] Assignee: British Cast Iron Research Association, Birmingham, England
[22] Filed: Aug. 26, 1969
[21] Appl. No.: 870,820

Related U.S. Application Data

[62] Division of Ser. No. 637,222, May 9, 1967, Pat. No. 3,472,307.

[30] Foreign Application Priority Data

May 14, 1966 Great Britain......................21,507/66

[52] U.S. Cl..............................164/193, 164/21, 164/200, 259/18
[51] Int. Cl.......................................................B22c 15/24
[58] Field of Search ............................164/200–202, 20–22, 164/37, 192, 193; 259/4, 18, 36

[56] References Cited

UNITED STATES PATENTS

| 1,330,174 | 2/1920 | De Cew | 259/18 X |
| 3,439,733 | 4/1969 | Miller et al. | 164/200 |

FOREIGN PATENTS OR APPLICATIONS

| 735,355 | 8/1955 | Great Britain | 164/201 |
| 620,891 | 5/1961 | Canada | 164/21 |

Primary Examiner—Robert D. Baldwin
Attorney—Scrivener, Parker, Scrivener & Clarke

[57] ABSTRACT

Foundry cores (and possible also molds) are formed using a fast-curing resin by putting the resin in one body of sand and the resin-curing catalyst in another body of sand, blowing these two bodies into a common chamber and then immediately transferring the resulting mixture, for example by blowing, to the core-forming or mold-forming cavity.

8 Claims, 1 Drawing Figure

3,662,812
PATENTED MAY 16 1972
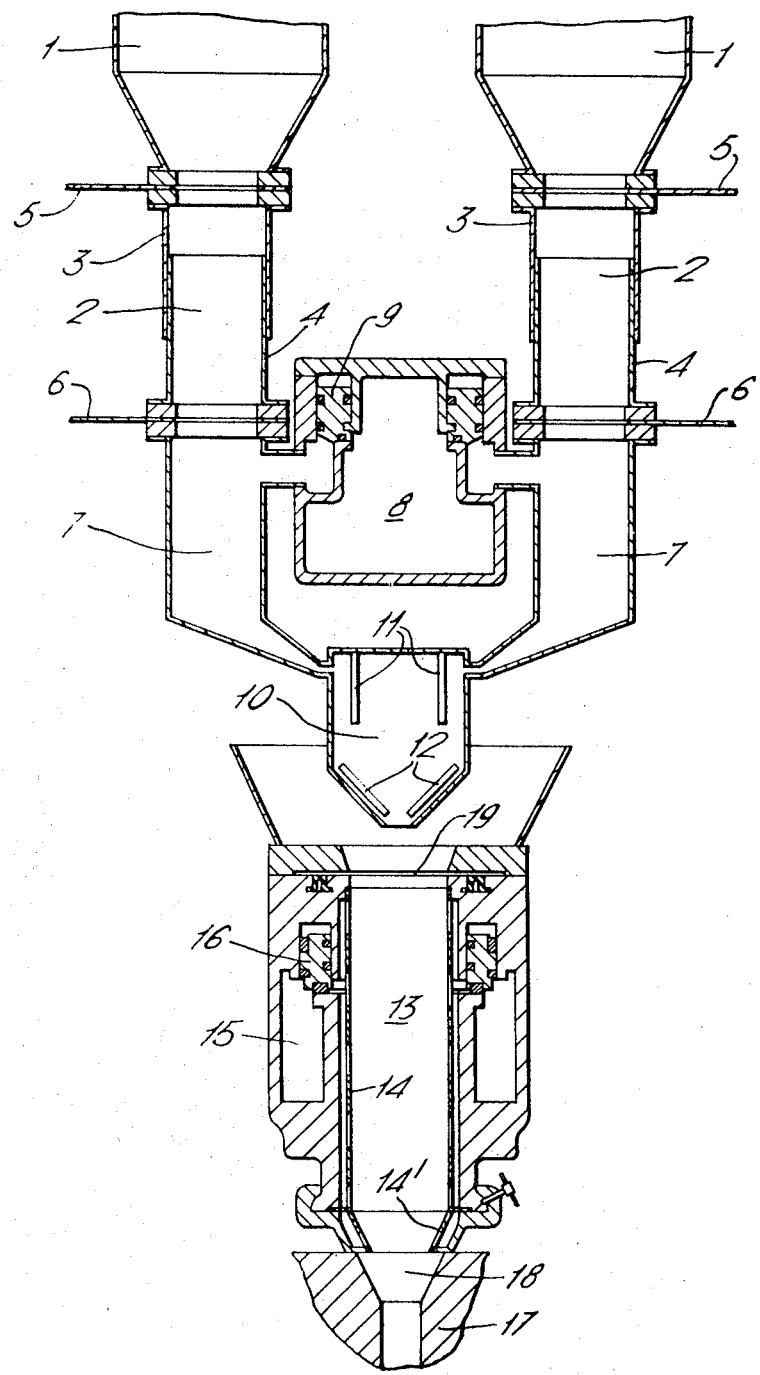

APPARATUS FOR MIXING SAND/RESIN/CATALYST AND BLOWER-FORMING FOUNDRY CORES

This is a divisional of application Ser. No. 637,222 filed May 9, 1967, now U.S. Pat. No. 3,472,307 issued Oct. 14, 1969.

This invention relates primarily to the curing of foundry cores, although it may also be applicable to moulds as well.

The demand for dimensionally accurate cores has led to increasing use of those processes for their production in which the core is cured in its box.

Cores made by the carbon dioxide process, while easy to make, are relatively weak even in the gassed condition, and are not easy to knock out after casting. The cold-curing process gives cores of reasonable strength but the time taken in curing means that, where there is large volume production, a lot of core-boxes are tied up and a lot of space occupied. The so-called hot-box process, in which a sand-resin mix complete with the catalyst is blown into a heated core-box and the heat imparts a rapid cure, makes a high rate of production possible, for example a core or set of cores every thirty seconds, but the high temperatures involved necessitate the use of metal core-boxes. These are expensive to produce, especially where ejector pins are incorporated.

Accordingly it has been proposed to use a resin and catalyst which react rapidly without heat and to bring them together only at the last minute before blowing the sand/resin/catalyst mixture into the core-box, whereupon the core sets quickly in the cold and can be extracted from the box after only a short delay. However, there are practical difficulties in achieving adequate mixing without delay; one method proposed has been to divide the sand into two bodies, mixing the resin with one of these and the catalyst with the other, and then to mix these two bodies of sand together in a mechanical mixer and to blow the resulting mixture into the core-box as soon as possible after mixing. It is found difficult to achieve adequate mixing in this way, and a further serious drawback is that any material inadvertently left in the mixer or in any other parts of the apparatus will set and will subsequently have to be cleaned out by hand.

The aim of the present invention is to provide an arrangement in which the mixing is quick and thorough and there is the minimum of delay between mixing and blowing, and in which furthermore there is little or no danger of any of the material becoming lodged in the mixing apparatus.

According to the invention we now propose to take the two sands, one containing resin and the other containing the catalyst, and to blow them by air pressure simultaneously into a common chamber and then virtually immediately blow the resulting mixture into the core-box or mould-box. By the phrase "virtually immediately" we mean within a time too short for curing to take place before the mixture is in the core-box or mould-box. The action of blowing the two bodies of sand into the common chamber can be performed in a fraction of a second, and so can the operation of blowing the mixture from the chamber into the core-box or mould-box, so the delay is primarily in spend of operation of the various controlling valves and in practice the whole operation can be completed in under 2½ seconds.

The mixing action achieved primarily simply by the step of blowing the two bodies of sand simultaneously into a common chamber can be further assisted by providing deflectors in the chamber to divert the incoming streams and assist their thorough mixing.

Virtually the whole of the kinetic energy imparted to the two bodies of sand by the blowing air that blows them into the third chamber is used up in achieving mixing of the two bodies in the common chamber.

The invention will now be further described by way of example with reference to the accompanying drawing, which illustrates a cross-sectional elevation of apparatus suitable for carrying out the process of the invention.

At the upper end of the apparatus are two small sand storage hoppers 1, and below them are measuring chambers 2 of basically cylindrical shape, each chamber being formed by telescoping cylindrical walls 3 and 4 so that the volume of each chamber can be varied if desired. The top of each chamber 2 is closed by a horizontally moving slide valve 5, and the bottom by a similar valve 6, but the lower valve 6 is made to be fully air-tight when closed whereas air-tightness is less important with the upper valve.

Below the measuring chambers 2 are blowing chambers 7, both connected to a common blowing air supply comprising an air reservoir 8 with an annular piston control valve 9 controlling the admission of air to the blowing chambers. The lower ends of these two chambers lead into opposite sides of the upper end of a mixing and blending chamber 10 in which the two charges of sand mix and the resin contained in one charge starts to react with the catalyst contained in the other. An important feature of this chamber 10 is the provision in it of two rows of rods 11 extending downwards from its roof near the points of entry of the two sand charges. The rods in one row are staggered with respect to those in the other row. The incoming sand impinges on those rods and is deflected by them, so that they break up the two streams of sand and form them into individual sprays which cross one another and ensure effective mixing of the two charges. Mixing is further assisted by the presence of a pair of downwardly converging plates 12 in the lower part of the chamber, provided with corrugated surfaces on which the sand impinges and rebounds in random directions. Like the rods, these plates are laterally staggered so that the peaks on one plate are aligned with the troughs in the other. Between the lower edges of the two plates is left a slot or gap through which the blended sand passes as it leaves the chamber.

The lower end of the chamber 10 leads into a further blowing chamber 13, which can be of known construction, except that there should be as little dead space as possible in its outlet nozzle, so as to avoid the build-up, at that point, of cured sand/resin/catalyst mixture. With this aim in view, the so-called blow sleeve 14 in the form of a perforated cylindrical shell is extended downwards by the provision of an extra frusto-conical portion 14' within the nozzle itself, so that the blowing air, admitted from a surrounding reservoir 15 under the control of an annular piston valve 16, flows also in the region of the nozzle and ensures complete discharge of its contents.

Part of the core-box is shown at 17. Its inlet is widened out at 18 to form a space that takes over the function normally performed by the blowing chamber nozzle, of absorbing the inevitable slight excess quantity of mixture surplus to that required to fill the core cavity.

In a modification, where it is considered desirable to be able to use standard core-boxes, the excess sand could still be allowed to lodge in the tip of the nozzle of the blower and in that case the nozzle could be arranged to swing aside automatically after each blowing operation, and for the sand to be automatically ejected from it by suitable mechanical or pneumatic means.

The operation of the apparatus described is as follows: sand containing resin is placed in one of the hoppers 1 and sand containing catalyst is placed in the other. The upper slide valves 5 are opened to fill the measuring chambers 2, these chambers having been previously adjusted in size so that the volume of the two of them added together matches the required total charge needed to fill the core-box. Preferably the chambers are adjusted equally so that the two charges are of substantially equal weight. The valves 5 are closed again and the valves 6 are opened to allow the two sand charges of predetermined volume to pass into their respective blowing chambers. Then after the valves 6 have been closed to seal off the chambers the piston valve 9 is lifted to admit air to the two chambers 7 and blow their charges into the chamber 10 where they mix and pass into the standard core-blower 13. A valve 19 in its upper end is closed and then the mixed charge is blown into the core-box in a normal manner.

Because the materials are cold the core-box can be of light construction, not necessarily of metal, and could for example be in the form of a glass-fiber-reinforced synthetic resin structure. Yet in contrast to known cold-curing methods, that according to the invention takes place almost immediately and there is normally no need to delay more than a minute or 2 before removal of the core from the box, although where the core shape involves delicate and thin sections a slightly longer delay of two or three minutes may sometimes be advisable.

It will be understood that the sequence of valve operations, which may be performed pneumatically or hydraulically under the control of solenoid valves, can be controlled automatically, and timed in synchronism with the operation of feeding and clamping arrangements for the core-boxes brought successively below the blower head.

It is of course important that there should be no undue delay between mixing of the two charges and blowing the resulting mixture into the core-box. In practice, with the apparatus described above, we find that the mixture can be in the core-box within 1 seconds of its formation.

The resin and the catalyst can be of known kinds. In one preferred method, using a known high-speed resin/catalyst system, one of the sand charges contains approximately 2 percent by weight of resin and the other contains 2 percent by weight of catalyst, so that the resulting mixture contains one percent of each. In tests it was found that increasing the amount of catalyst could result in the strength of the cores produced increasing on standing for up to 24 hours. Successful results were obtained with a resin content of 1.14 percent by weight in the one charge and a catalyst content of 2.86 percent by weight in the other charge, giving a resin/catalyst ratio of 1 to 2.5, and a total weight of resin plus catalyst of 2 percent of the mixture.

With some known resins and catalysts used in tests it has been found that the sand should not be allowed to stand unduly long with the resin already added to it, or with the catalyst already added to it, before it is used. Tests have shown that the strength of the cores produced is adversely affected if the separate charges are allowed to stand more than about 1 hour. Therefore preferably the sand/resin mixture and the sand/catalyst mixture are only made up a few minutes before use.

I claim:

1. Apparatus for forming sand-based foundry core and mould bodies by a substantially cold process comprising first and second sand hoppers, first and second measuring chambers connected to said first and second hoppers respectively, first and second blowing chambers having outlets, said first and second blowing chambers being connected respectively to said first and second measuring chambers to receive measured quantities of material therefrom, valve means between each of said hoppers and the respective said measuring chamber, further valve means between each of said measuring chambers and the respective said blowing chamber, said valve means and further valve means being operable in sequence to allow predetermined quantities of materials from said hoppers to be received from said hoppers and to pass to said blowing chambers, a common mixing chamber, structure defining passages connecting said outlets of said blowing chambers to said mixing chamber, means for admitting gas under pressure to each of said blowing chambers to force the contents thereof through said passages into said mixing chamber, means for discharging the contents of said mixing chamber, a mould box having therein a cavity placed to receive the discharged contents of said mixing chamber and means for substantially immediately transferring the discharged contents of said mixing chamber into the cavity of said mould box.

2. Apparatus for forming sand-based foundry core and mould bodies by a substantially cold process comprising first and second sand quantity measuring and dispensing means, first and second blowing chambers having outlets, said first and second measuring and dispensing means being disposed to discharge predetermined quantities of sand-containing material into said first and second blowing chambers respectively, a common mixing chamber, structure defining passages connecting said outlets of said blowing chambers to said mixing chamber, means for admitting gas under pressure to each of said blowing chambers to force the contents thereof through said passages into said mixing chamber, means for discharging the contents of said mixing chamber, a mould box having therein a cavity placed to receive the discharged contents of said mixing chamber, and means for substantially immediately transferring the discharged contents of said mixing chamber into the cavity of said mould box.

3. Apparatus as set forth in claim 1, including static deflecting means, said deflecting means being disposed within said mixing chamber and aligned with the paths of material entering said chamber via said passages.

4. Apparatus as set forth in claim 3, wherein said deflecting means comprise two sets of rods, the rods of each set being disposed in one of said respective paths and extending transverse to the path.

5. Apparatus as set forth in claim 4 wherein said paths are oppositely directed and wherein the rods of one of said sets are staggered with respect to the rods of the other set.

6. Apparatus as set forth in claim 1, including a corrugated surface within said mixing chamber, said surface being disposed to be impinged upon by the contents of said chamber on discharge thereof.

7. Apparatus as set forth in claim 1, wherein said transfer means comprises a common blowing chamber disposed to receive the contents of said mixing chamber and means for admitting gas under pressure to said blow chamber to discharge the contents thereof into said cavity.

8. Apparatus as set forth in claim 1 wherein each of said first and second measuring chambers comprises to two relatively movable parts, said parts being movable such as to vary the volume of the chamber formed thereby.

* * * * *